United States Patent Office 3,203,923
Patented Aug. 31, 1965

3,203,923
ORGANOSILICON COMPOUNDS CONTAINING
PHOSPHORUS AND NITROGEN
Frank Fekete, Monroeville, Pa., assignor to Union Carbide Corporation, a corporation of New York
No Drawing. Filed July 25, 1960, Ser. No. 44,881
21 Claims. (Cl. 260—46.5)

This invention relates to novel organosilicon compounds which contain phosphorus and nitrogen.

The compounds of this invention include hydrocarbonoxysilanes and siloxanes containing a phosphinylidyne group [i.e. a group having the formula ≡P(O)] which is bonded to one monovalent hydrocarbon group, halogen-substituted monovalent hydrocarbon group or hydrocarbonoxy group and to two nitrogen atoms, each of which nitrogen atoms is also bonded to a hydrocarbonoxysilyl or siloxysilyl group through three carbon atoms of a divalent hydrocarbon group. Also included among the compounds of this invention are polymers produced by hydrolyzing and condensing those hydrocarbonoxysilanes and siloxanes of this invention wherein the phosphorus atom is bonded to a hydrocarbonoxy group.

The hydrocarbyloxysilanes of this invention are represented by the formula:

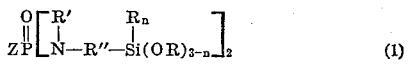  (1)

wherein Z is a monovalent hydrocarbon group, a halogen-substituted monovalent hydrocarbon group or a hydrocarbonoxy group, R is a monovalent hydrocarbon group, R' is a hydrogen atom or a monovalent hydrocarbon group, R'' is a divalent hydrocarbon group, n is an integer from 0 to 2 inclusive and each nitrogen atom is interconnected to silicon through at least three carbon atoms.

Illustrative of the monovalent hydrocarbon groups represented by Z, R and R' in Formula 1 are the linear alkyl groups (for example the methyl, ethyl, propyl, butyl and stearyl groups), the cyclic alkyl groups (for example the cyclohexyl and cyclopentyl groups, the linear alkenyl groups (for example the vinyl and the allyl groups), the cyclic alkenyl groups (for example the cyclopentenyl and the cyclohexenyl groups), the aryl groups (for example the phenyl and naphthyl groups), the alkaryl groups (for example the tolyl group) and the aralkyl groups (for example the benzyl and beta-phenylethyl groups).

Illustrative of the divalent hydrocarbon groups represented by R'' in Formula 1 are the linear alkylene groups (for example the trimethylene, —(CH$_2$)$_3$—, and the octadecamethylene, —(CH$_2$)$_{18}$— groups), the arylene groups (for example the naphthylene, —C$_{10}$H$_6$— and para-phenylene, —C$_6$H$_4$— groups); the cyclic alkylene groups (for example the cyclohexylene —C$_6$H$_{10}$— group); the alkarylene groups (for example the tolylene,

CH$_3$C$_6$H$_3$— group) and the aralkylene group (for example the —CH$_2$(C$_6$H$_5$)CHCH$_2$CH$_2$— group).

Illustrative of the halogen-substituted monovalent hydrocarbon groups represented by Z in Formula 1 are the linear haloalkyl groups (for example the chloromethyl, gamma-chloropropyl, delta-bromobutyl, omega-bromostearyl and the like), the cyclic haloalkyl groups (for example the chlorocyclohexyl and chlorocyclopentyl groups), the linear haloalkenyl groups (for example the chlorovinyl and the bromoallyl groups), the cyclic alkenyl groups (for example the bromocyclopentenyl and the bromocyclohexenyl groups), the haloaryl groups (for example the chlorophenyl and bromonaphthyl groups), the haloalkaryl groups (for example the chlorotolyl group) and the haloaralkyl groups (for example the chlorobenzyl and the bromophenylethyl groups).

Illustrative of the hydrocarbonoxy groups represented by Z in Formula 1 are the alkoxy groups (for example the methoxy, ethoxy, n-propoxy, n-butoxy, tert-butoxy and n-pentoxy groups) and the aryloxy groups (for example the phenoxy group).

The preferred silanes of this invention are those represented by Formula 1 wherein Z, R and R' each individually contain from 1 to 18 carbon atoms and wherein R'' contains at least 3 carbon atoms, and most preferably from 3 to 5 carbon atoms, interconnecting silicon and nitrogen but contains not more than 18 carbon atoms.

Illustrative of the silanes of this invention are:

CH$_2$=C(CH$_3$)P(O)[p-NHC$_6$H$_4$Si(OCH$_3$)$_3$]$_2$
C$_6$H$_{11}$P(O)[NH(CH$_2$)$_4$Si(C$_6$H$_5$)$_2$OC$_2$H$_5$]$_2$
ClC$_6$H$_4$P(O)[NH(CH$_2$)$_5$Si(OC$_3$H$_7$)$_2$CH$_3$]$_2$
ClC$_2$H$_4$P(O)[NH(CH$_2$)$_3$Si(OC$_2$H$_5$)$_3$]$_2$
C$_6$H$_5$OP(O)[NH(CH$_2$)$_4$Si(OC$_3$H$_7$)$_3$]$_2$

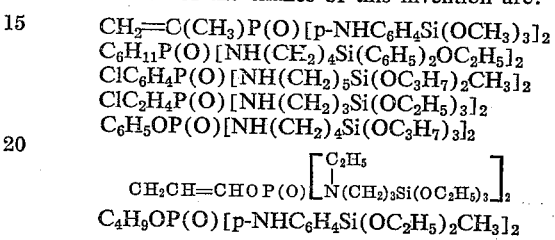

C$_4$H$_9$OP(O)[p-NHC$_6$H$_4$Si(OC$_2$H$_5$)$_2$CH$_3$]$_2$ and the like.

The siloxanes of this invention contain a group represented by the formula:

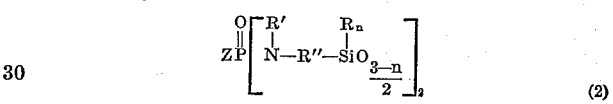  (2)

where Z, R, R', R'' and n have the above-defined meanings and each nitrogen atom is interconnected to silicon through at least three carbon atoms. Illustrative of the groups represented by Formula 2 are the

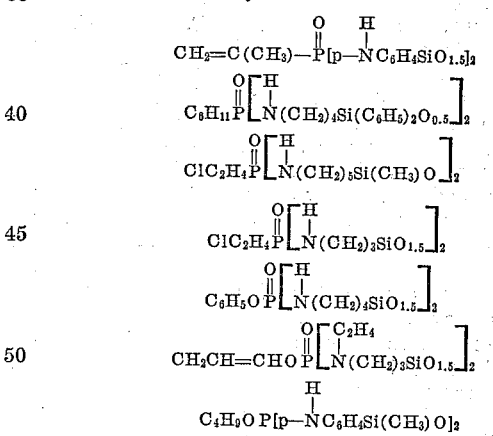

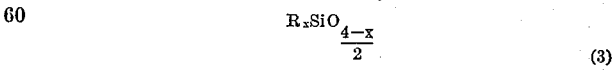

and the like.

The siloxanes of this invention include those siloxanes that are composed solely of groups represented by Formula 2 and also include those siloxanes that contain one or more groups represented by Formula 2 together with one or more groups represented by the formula:

  (3)

wherein R has the above-defined meanings and x has a value from 0 to 3 inclusive. Illustrative of the groups represented by Formula 3 are: the SiO$_2$, phenylsiloxy, methylsiloxy, dimethylsiloxy, methylethylsiloxy, trimethylsiloxy, diphenylsiloxy, vinyl(methyl)siloxy, divinylsiloxy, methyldiphenylsiloxy, and dicyclohexylsiloxy groups and the like.

The hydrocarbonoxy silanes and siloxanes of this invention are advantageously prepared by reacting a silicon compound (i.e. a hydrocarbonoxysilane or a siloxane) having an amino group interconnected to silicon through a divalent hydrocarbon group with a phosphorus compound composed of a phosphinylidyne group having two halogen atoms bonded to phosphorus, the remaining valence of phosphorus being filled by a monovalent hydrocarbon group, halogen-substituted monovalent hydrocarbon group or a hydrocarbonoxy group. The reaction is represented by the skeletal equation:

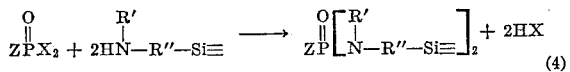
(4)

wherein Z, R' and R'' have the above-defined meanings, X is a halogen atom (preferably chlorine or bromine), and the free valences of the silicon atom bond the silicon atom (in the case of the silanes) to at least one hydrocarbonoxy group or (in the case of siloxanes) to at least one siloxy group and any remaining free valences of the silicon atom bond the silicon atom to a monovalent hydrocarbon group.

The process is best carried out by forming a reaction mixture containing the silicon compound used as a starting material and the phosphorus compound used as a starting material and maintaining the reaction mixture at a temperatue at which the desired reaction occurs. The continuous removal from the reaction zone of the hydrogen halide [HX in Equation 4] as it is formed in the reaction is preferred.

The mole ratio of the phosphorus compound and the silicon compound employed in the reaction represented by Equation 4 is not narrowly critical. Stoichiometric amounts, i.e., the relative molar amounts indicated by the above equation, are preferred for efficient reaction and ease of product recovery. For example, one gram atom of the nitrogen-bonded hydrogen of the silicon compound desired to be displaced is preferred for each gram atom of phosphorus-bonded halogen of the phosphorus compound.

The temperature of the reaction is not narrowly critical and can be varied in accordance with the speed of reaction desired. Temperatures of 20° C. to 300° C. are advantageous in providing a smooth reaction and high yields of products. Temperatures below 20° C. can be employed if desired but the reaction rate is slowed. Temperatures above 300° C. can also be employed but the likelihood of reduced yields is greater and the expense of operating at such high temperatures is undesirable. The process is advantageously carried out at atmospheric pressure or at whatever pressures exist in the particular reaction vessel employed without purposely applying increased or reduced pressures (i.e. autogenous pressure). Sub-atmospheric or super-atmospheric pressures can be employed, however, if desired.

No catalysts are required to effect the reaction represented by Equation 4 although suitable catalysts such as tetramethyl ammonium chloride, trimethyl benzyl ammonium chloride and the like can be employed for whatever advantage they may provide. Solvents also are not required but under certain conditions are useful in simplifying the handling of the reaction mixture or reducing the reaction time by providing a homogeneous reaction mixture if such is not otherwise obtainable. If a solvent is employed xylene, toluene, benzene, methylethyl ketone, dimethyl formamide, and the like can be used. A solvent which dissolves the starting materials and the products but does not dissolve hydrogen halides is particularly useful in removing the hydrogen halides from the reaction zone. Such solvents include toluene, benzene, xylene, dimethyl formamide, and the like.

The hydrogen halide (HX) formed in the reaction represented by Equation 4 is preferably continuously removed from the reaction zone by any suitable method of which many are known. A particularly suitable method is to add to the reaction mixture a hydrogen halide acceptor in the approximate stoichiometric amounts based on the amount of hydrogen halide expected to be formed in the reaction. Tertiary amines (e.g., triethyl amine, pyridine, tributyl amine, and the like) are some of the excellent hydrogen halide acceptors. Such tertiary amines form salts with the hydrogen halide which salts are insoluble in the reaction mixture. Excess amounts of the acceptors over and above the stoichiometric amount is preferably employed to ensure the substantially complete removal of the hydrogen halide. Alternately, the hydrogen halide can be continuously removed by heating the reaction mixture to cause the hydrogen halide to be evolved from the reaction mixture. Although it is not necessary in order to obtain a product, it is preferable, no matter what particular technique is employed in removing hydrogen halide, to maintain the pH of the system above a pH of about 6 and below a pH of about 8. It is preferable to maintain the pH above about 6 to prevent decreased yields due to possible side reactions involving the hydrogen halide formed in the process. It is preferable to maintain the pH below about 8 to prevent possible side reactions involving the silicon compound (e.g. reactions between the silicon compound and strongly basic hydrogen halide acceptors in the event moisture is also present).

The compounds of this invention can be isolated at the completion of the above-described process for their production by any suitable conventional means. Thus the relatively low boiling compounds of this invention (i.e., in general, the hydrocarbonoxysilanes) can be isolated by filtration to remove insoluble salts and fractional distillation of the filtrate. The relatively high boiling compounds of this invention (i.e., in general, the siloxanes) can be isolated by filtration to remove any salts and then stripping foreign material. In addition, extraction, recrystallization and other various conventional means can be employed to isolate the compounds of this invention.

The phosphorus compounds employed as starting materials in producing the compounds of this invention are represented by the formula:

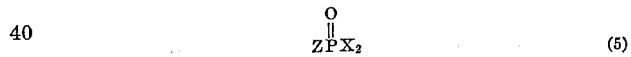
(5)

wherein Z and X are as previously defined. Suitable starting compounds include the sub-classes of compounds having the formula: $RP(O)X_2$; $(XR)P(O)X_2$; and

The preferred starting phosphorus compounds are those as described above wherein the phosphorus-bonded monovalent hydrocarbon groups, halogen-substituted monovalent hydrocarbon groups and/or hydrocarbonoxy groups each contains from 1 to 18 carbon atoms. Illustrative of specific phosphorus compound starting materials are $[CH_2=C(CH_3)]P(O)Cl_2$, $(C_6H_5)P(O)Br_2$
$C_8H_{17}P(O)Cl_2$, $C_6H_5CH=CHP(O)Br_2$, $C_6H_{11}P(O)Cl_2$
$(ClC_6H_4)P(O)Cl_2$, $(C_6H_5O)P(O)Cl_2$,
$(CH_2=CHCH_2O)P(O)Cl_2$, $(C_4H_9O)P(O)Cl_2$ and the like.

The silicon compounds employed as starting materials in the process for making the novel compound of this invention include both hydrocarbonoxysilanes and siloxanes that contain an amino group interconnected to silicon through a divalent hydrocarbon group. The hydrocarbonoxysilanes used as starting materials in producing the hydrocarbonoxysilanes of this invention are represented by the formula:

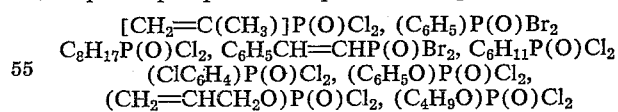
(6)

wherein R, R', R'' and n have the above-defined meanings and the nitrogen atom is interconnected to silicon through at least three carbon atoms. Illustrative of these silanes are gamma-aminopropyltriethoxysilane, para-amino-phenyltrimethoxysilane, delta - aminobutyl(diphenyl)-ethoxysilane, epsilon - aminopentyl(methyl)dipropoxysilane, N-propyl-para-aminophenyl(ethyl)dimethoxysilane, N-ethyl-gamma-aminopropyltriethoxysilane, delta-aminobutyltripropoxysilane, para - aminophenyl(methyl)diethoxysilane and the like.

The siloxanes that are used as starting materials in producing the siloxanes of this invention contain a group that is represented by the formula:

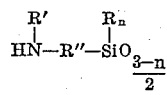

(7)

wherein R, R', R", and $n$ have the above-defined meanings and the nitrogen atom is interconnected to silicon through at least three carbon atoms. Illustrative of the groups represented by Formula 7 are the gamma-aminoproplysiloxy, para-aminophenylsiloxy, delta-aminobutyl-(diphenyl)siloxy, epsilon-aminopentyl(methyl)siloxy, N-propyl-para-aminophenyl(ethyl)siloxy, N-ethyl-gamma-aminopropylsiloxy, delta-aminobutylsiloxy and para-aminophenyl(methyl)siloxy groups and the like.

Suitable starting siloxanes include both those siloxanes that are composed solely of groups represented by Formula 7 and those siloxanes that contain one or more groups represented by Formula 7 together with one or more groups represented by Formula 3.

The polymers of this invention are produced by hydrolyzing and condensing those hydrocarbonoxysilanes and siloxanes of this invention wherein the phosphorus atom is bonded to at least one hydrocarbonoxy group (i.e. those silanes and siloxanes of this invention wherein Z in the Formula 1 and 2 is a hydrocarbonoxy group, OR) contain a group that is represented by the formula:

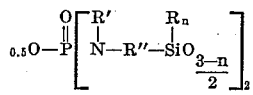

(8)

wherein R, R', R" and $n$ have the above-defined meanings. In such groups the phosphorus atom provides a link in the polymeric chain.

The silicon atoms in the group represented by Formula 8 can be linked through oxygen only to silicon or phosphorus or can be linked through oxygen to both silicon and phosphorus of other groups represented by Formula 8 to provide links in the polymeric chain. The phosphorus atom in Formula 8 can be linked through oxygen to either silicon or phosphorus of another group represented by Formula 8 to provide a link in the polymeric chain. Such polymeric chains can be cyclic or can be terminated by hydroxyl or hydrocarbonoxy groups linked to a silicon atom or to the phosphorus atom. Such polymeric chains can also be terminated by an $R_3SiO_{0.5}$ group linked to a silicon atom in the group represented by Formula 8.

When the phosphorus atom in a group represented by Formula 8 is linked through oxygen to a silicon atom of another group represented by Formula 8, the groups so linked can be depicted by the formula:

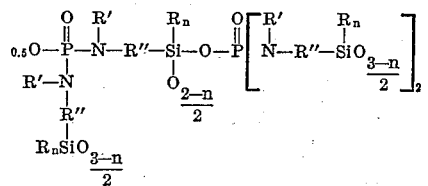

(8a)

wherein R, R', R" and $n$ have the above-defined meaning.

When the phosphorus atom in the group represented by Formula 8 is linked through the oxygen atom to the phosphorus atom of another group represented by Formula 8, the groups so linked can be depicted by the formula:

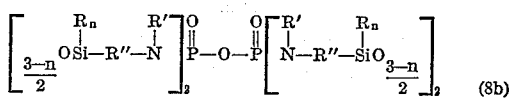

(8b)

wherein R, R', R" and $n$ have the above-defined meaning.

Illustrative of the polymers of this invention that contain a group represented by Formula 8 are the polymers which can be produced by the hydrolysis and condensation of the silane,

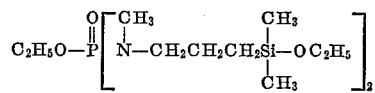

Such polymers contain the group

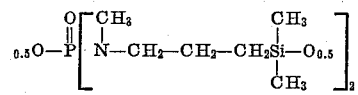

The hydrolysis and condensation reactions whereby are produced polymers containing groups represented by Formula 8 can be conducted at temperatures from 0° C. to 250° C. Temperatures in the range of about 50° C. to 150° C. are preferred in order to hasten the hydrolysis and condensation without thermal decomposition. A solvent is preferably employed to provide ease of handling the reaction mixture. Suitable solvents are the liquid hydrocarbons, (e.g., toluene, benzene, xylene and the like), alcohols (e.g., ethanol, iso-propanol and the like) and ethers (e.g., diisopropyl ether, diethyl ether and the like).

It is desirable, particularly where the hydrocarbonoxy group represented by Z is of relatively high molecular weight, to accelerate the rate of the hydrolysis and condensation reaction by employing a catalyst. By way of illustration, from about 0.5 to 3 percent by weight (based on the water reacted) of an inorganic acid (such as hydrochloric acid or sulfuric acid) can be used as a catalyst.

The amount of water employed in the hydrolysis and condensation is at least one mole for each mole of Si—O—Si, Si—O—P and P—O—P linkages desired to be produced (i.e., one mole of water for each two moles of silicon-bonded and/or phosphorus-bonded hydrocarbonoxy groups desired to be hydrolyzed to form silicon-bonded hydroxyl groups which condense with each other to form the Si—O—Si, Si—O—P or P—O—P linkages). A small excess of water over and above this amount is preferred for speed and ease of reaction. Of course, silicon-bonded and phosphorus-bonded hydrocarbonoxy groups can be present in the polymer, if desired, by incompletely hydrolyzing the silicon-bonded and phosphorus-bonded hydrocarbonoxy groups by using lesser amounts of water. Silicon-bonded and phosphorus-bonded hydroxyl groups can be present in the polymer if desired, by incompletely condensing the hydroxy groups formed by hydrolysis. Such incomplete condensation is effected by using a large excess of water and short reaction times in the hydrolysis and condensation.

After completion of the hydrolysis and condensation, low boiling materials such as water, alkanol by-products, solvents and the like can be removed from the reaction mixture by conventional means (e.g. distillation at reduced pressure).

It should be understood that polymers containing groups represented by Formula 8 are mixtures of compounds from which can be separated (e.g., by extraction or fractional crystallization) compounds containing only a particular type grouping (e.g. phosphorus combined only in P—O—P or only in P—O—Si linkages).

The polymers of this invention that contain groups represented by Formula 8 can also contain one or more groups represented by Formula 3. The latter groups are present in these polymers when silanes having the formula $R_xSi(OR)_{4-x}$ where R and $x$ have above-defined meanings are cohydrolyzed and cocondensed along with a suitable (i.e. P—OR containing) silanes or siloxanes of this invention in the production of the polymers. Alternately a group or groups represented by Formula 3 are present in the polymer if suitable starting siloxanes of this invention are employed that contain a group or groups represented by Formula 3.

When suitable starting siloxanes of this invention are employed in producing polymers containing groups represented by Formula 8 (i.e., those containing P—OR groups), little or no Si—OR or SiOH groups may be initially present to react to form ≡Si—O—P linkages. However ≡Si—O—Si≡ linkages in the siloxane can react with the water and alcohol (i.e. the alcohol formed by the hydrolysis of P—OR) to produce Si—OR and/or Si—OH. The presence of P—OH groups catalyzes such reactions of the normally stable Si—O—Si linkage.

Phosphorus-bonded monovalent hydrocarbon and halogen-substituted monovalent hydrocabron groups have greater hydrolytic stability than phosphorus-bonded hydrocarbonoxy groups. Consequently, when a silane of this invention wherein Z is a monovalent hydrocarbon or a halogen-substituted monovalent hydrocarbon group, is hydrolyzed and condensed according to the above-described procedure, the product is the corresponding siloxane of this invention containing a phosphorus-bonded monovalent hydrocarbon group or halogen-substituted monovalent hydrocarbon group.

The compounds of this invention are useful as lubricants and as additives to lubricants for improving the lubricity thereof. In particular they can be added to organopolysiloxane lubricating fluids for imparting improved lubricity thereto. The siloxanes containing groups represented by Formula 2 and the polymers containing groups represented by Formula 8 are also useful as flame and solvent resistant, protective coatings, particularly on metals such as steel, copper and aluminum. Such siloxanes and polymers can be formed in situ on the metal surface or can be pre-formed and then applied as a dilute solution to the metal surface. After drying and curing the coating protects the metal even under severely corrosive, wet and dry conditions.

The following examples illustrate the present invention:

*Example 1*

One mole (221 grams) of gamma-aminopropyltriethoxysilane and one mole (101 grams) of triethylamine were charged to a kettle fitted with a stirrer, condenser and dropping funnel. One-half mole (83.75 grams) of $ClCH_2P(O)Cl_2$ was charged to the dropping funnel. The $ClCH_2P(O)Cl_2$ was added slowly over a period of about 15 minutes into the kettle with stirring. The temperature increased from 23° C. to 128° C. during the addition. Triethylamine hydrochloride precipitated from the reaction mixture. The reaction mixture was filtered while hot, and the filtrate was filtered again. The precipitate separated in the filtrations was washed with toluene and benzene. The toluene and benzene was distilled from the washings and the residual liquid added to the original filtrate. An 86 percent yield (229 grams) of liquid product that had the formula $$ClCH_2P(O)[NH(CH_2)_3Si(OC_2H_5)_3]_2$$

was obtained as the filtrate. This product had an index of refraction, $n_D^{25}$, of 1.4560 and a pH of about 7. Elemental analysis for carbon, hydrogen, silicon, phosphorus and nitrogen and infra-red analysis confirmed the composition and structure of the product.

*Example 2*

When one mole para-aminophenyltrimethoxysilane and one-half mole of $[CH_2=CH(CH_3)]P(O)Cl_2$ are reacted in the presence of one mole of triethylamine employing the procedure set forth in Example 1, the product obtained is represented by the formula:

$[CH_2=CH(CH_3)]P(O)—[p—\overset{H}{N}C_6H_4Si(OCH_3)_3]_2$

The formula of this compound can be confirmed by standard infrared and elemental analysis and cryoscopic molecular weight determinations.

*Example 3*

When one mole of N-ethyl-gamma-aminopropyltriethoxysilane is reacted with one-half mole of $$(CH_2=CHCH_2O)P(O)Cl_2$$

in the presence of one mole of triethylamine employing a procedure similar to that disclosed in Example 1, the product obtained is represented by the formula:

The formula of this compound can be confirmed by standard infrared and elemental analysis and cryoscopic molecular weight determinations.

*Example 4*

When one mole of $C_6H_5OP(O)Cl_2$ is reacted with two moles of delta-aminobutyltripropoxysilane in the presence of two moles of triethylamine employing a procedure similar to that described in Example 1, the product obtained is represented by the formula:

$$C_6H_5OP(O)[NH(CH_2)_4Si(OC_3H_7)_3]_2$$

The formula of this compound can be confirmed by standard infrared and elemental analysis and cryoscopic molecular weight determinations.

*Example 5*

When two moles of a siloxane having the formula:

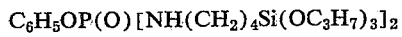

one mole of $C_4H_9OP(O)Cl_2$ and two moles of triethylamine are dissolved in toluene and the solution is heated for 0.5 hour at 100° C. there is produced a solution which can be filtered and stripped of toluene to produce a siloxane of this invention having the formula:

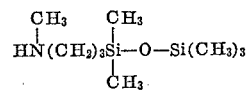

The formula of this compound can be confirmed by standard infrared and elemental analysis and cryoscopic molecular weight determinations.

*Example 6*

When one mole of a silane of this invention that is represented by the formula:

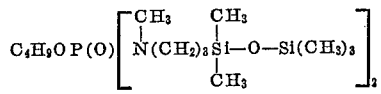

is dissolved in toluene and the solution so formed is mixed with one mole of water containing one percent by weight of hydrochloric acid and the mixture so formed is maintained at about 20° C. with stirring for about two hours, there is produced a polymer of this invention composed of groups having the formula:

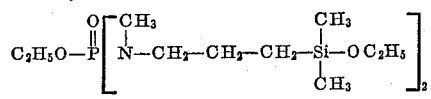

The polymer so formed can be isolated by separating the toluene, ethanol and any unreacted water therefrom by heating at 40° C. and 50 mm. of Hg pressure. The formula of this compound can be confirmed by standard infrared and elemental analysis and cryoscopic molecular weight determinations.

*Example 7*

When five parts by weight of either a siloxane of this invention (e.g. the siloxane produced as described in Example 5) or a polymer of this invention (e.g. the polymer produced as described in Example 6) is dissolved in 100 parts by weight of toluene and the solution so formed is sprayed on a steel surface according to conventional coating techniques, there is produced, upon volatilization of the toluene, a coating on the steel surface which protects the steel surface from corrosion.

*Example 8*

Following the above-described process, a siloxane of this invention having the formula:

$$\{C_2H_5P(O)[NH(CH_2)_3Si(CH_3)_2O_{0.5}]_2\}_2$$

is produced by reacting $C_2H_5POCl_2$ and $$\{H_2N(CH_2)_3Si(CH_3)_2O_{0.5}\}_2$$

What is claimed is:

1. A hydrocarbonoxysilane represented by the formula:

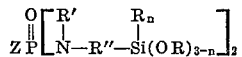

wherein Z is a member selected from the group consisting of the monovalent hydrocarbon groups, the halogen-substituted monovalent hydrocarbon groups and the hydrocarbonoxy groups; R is a monovalent hydrocarbon group, R' is a member selected from the group consisting of the hydrogen atom and the monovalent hydrocarbon group, R'' is a divalent hydrocarbon group, $n$ is an integer from 0 to 2 inclusive and each nitrogen atom is interconnected to silicon through at least three carbon atoms.

2. The hydrocarbonoxysilane of claim 1 wherein the group represented by Z is a hydrocarbonoxy group and R'' is an alkylene group containing from 3 to 5 carbon atoms.

3. The hydrocarbonoxysilane of claim 1 wherein R' is a hydrogen atom and R'' is an alkylene group containing from 3 to 5 carbon atoms.

4. The hydrocarbonoxysilane of claim 1 wherein R'' is an alkylene group containing from 3 to 5 carbon atoms and $n$ is 0.

5. The hydrocarbonoxysilane of claim 1 wherein R'' is an alkylene group containing from 3 to 5 carbon atoms and $n$ is 1.

6. The hydrocarbonoxysilane of claim 1 wherein R'' is an alkylene group containing from 3 to 5 carbon atoms and $n$ is 2.

7. The hydrocarbonoxysilane represented by the formula:

$$ClCH_2P(O)[NH(CH_2)_3Si(OC_2H_5)_3]_2$$

8. A siloxane comprising groups represented by the formula:

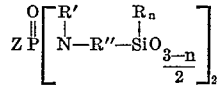

wherein Z is a member selected from the group consisting of the monovalent hydrocarbon groups, the halogen-substituted monovalent hydrocarbon groups and the hydrocarbonoxy groups, R is a monovalent hydrocarbon group, R' is a member selected from the group consisting of the hydrogen atom and the monovalent hydrocarbon group, R'' is a divalent hydrocarbon group, $n$ is an integer from 0 to 2 inclusive and each nitrogen atom is interconnected to silicon through at least three carbon atoms.

9. The siloxane of claim 8 wherein Z is a hydrocarbonoxy group and R'' is an alkylene group containing from 3 to 5 carbon atoms.

10. The siloxane of claim 8 wherein R' is a hydrogen atom and R'' is an alkylene group containing from 3 to 5 carbon atoms.

11. The siloxane of claim 8 wherein R'' is an alkylene group containing from 3 to 5 atoms and $n$ is 0.

12. The siloxane of claim 8 wherein R'' is an alkylene group containing from 3 to 5 carbon atoms and $n$ is 1.

13. The siloxane of claim 8 wherein R'' is an alkylene group containing from 3 to 5 carbon atoms and $n$ is 2.

14. The siloxane of claim 8 wherein R is a methyl group.

15. A siloxane comprising (a) groups represented by the formula:

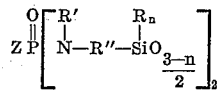

wherein Z is a member selected from the group consisting of the monovalent hydrocarbon groups, the halogen-substituted monovalent hydrocarbon groups and the hydrocarbonoxy groups, R is a monovalent hydrocarbon group, R' is a member selected from the group consisting of the hydrogen atom and the monovalent hydrocarbon group, R'' is a divalent hydrocarbon group, $n$ is an integer from 0 to 2 inclusive and each nitrogen atom is interconnected to silicon through at least three carbon atoms and (b) groups represented by the formula:

wherein R has the above-defined meaning and $x$ has a value from 0 to 2.

16. A polymer comprising polymeric units represented by the formula:

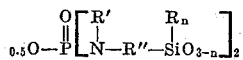

wherein R is a monovalent hydrocarbon group, R' is a member selected from the group consisting of the hydrogen atom and the monovalent hydrocarbon groups, R'' is a divalent hydrocarbon group, $n$ is an integer from 0 to 2 inclusive, each nitrogen atom is interconnected to silicon through at least three carbon atoms; and the phosphoruse atom and each silicon atom is bonded through oxygen to a member selected from the group consisting of phosphorus and silicon of another group represented by said formula.

17. The polymer of claim 16 wherein R'' is an alkylene group containing from 3 to 5 carbon atoms and $n$ is 0.

18. The polymer of claim 16 wherein R'' is an alkylene group containing from 3 to 5 carbon atoms and $n$ is 1.

19. The polymer of claim 16 wherein R'' is an alkylene group containing from 3 to 5 carbon atoms and $n$ is 2.

20. A process for producing a member selected from the group consisting of:

(A) a hydrocarbonoxysilane represented by the formula:

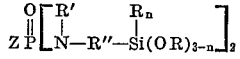

wherein Z is a member selected from the group consisting of the monovalent hydrocarbon groups, the halogen-substituted monovalent hydrocarbon groups and the hydrocarbonoxy groups, R is a monovalent hydrocarbon group, R' is a member selected from the group consisting of the hydrogen atom and the monovalent hydrocarbon group, R'' is a divalent hydrocarbon group, $n$ is an integer from 0 to 2 inclusive and each nitrogen atom is interconnected to silicon through at least three carbon atoms; and (B) a siloxane comprising groups represented by the formula:

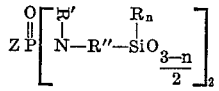

wherein Z, R, R', R'' and $n$ have the above-defined meanings and each nitrogen atom is interconnected to silicon through at least three carbon atoms; which process comprises reacting:

(I) a phosphorus compound having the formula:

$$Z\overset{O}{\underset{\|}{P}}X_2$$

wherein Z has the above-defined meaning and X is a halogen atom and (II) a silicon compound selected from the group consisting of:

(a) silanes having the formula:

$$\underset{H}{\overset{R'}{\underset{|}{N}}} - R'' - \overset{R_n}{\underset{|}{Si}}(OR)_{3-n}$$

and (b) siloxanes comprising groups having the formula:

$$\underset{H}{\overset{R'}{\underset{|}{N}}} - R'' - \overset{R_n}{\underset{|}{Si}} O_{\frac{3-n}{2}}$$

wherein R, R', R'' and $n$ have the above-identified meanings.

21. A process for producing the polymer of claim 16 which process comprises hydrolyzing and condensing a member selected from the group consisting of:

(A) hydrocarbonoxysilanes represented by the formula:

$$Z\overset{O}{\underset{\|}{P}}\left[\underset{N}{\overset{R'}{\underset{|}{}}} - R'' - \overset{R_n}{\underset{|}{Si}}(OR)_{3-n}\right]_2$$

wherein Z is a member selected from the group consisting of the monovalent hydrocarbon groups, the halogen-substituted monovalent hydrocarbon groups and the hydrocarbonoxy groups; R is a monovalent hydrocarbon group, R' is a member selected from the group consisting of the hydrogen atom and the monovalent hydrocarbon group, R'' is a divalent hydrocarbon group, $n$ is an integer from 0 to 2 inclusive and each nitrogen atom is interconnected to silicon through at least three carbon atoms; and (B) siloxanes comprising groups represented by the formula:

$$Z\overset{O}{\underset{\|}{P}}\left[\underset{N}{\overset{R'}{\underset{|}{}}} - R'' - \overset{R}{\underset{|}{Si}} O_{\frac{3-n}{2}}\right]_2$$

wherein Z is a member selected from the group consisting of the monovalent hydrocarbon groups, the halogen-substituted monovalent hydrocarbon groups and the hydrocarbonoxy groups, R is a monovalent hydrocarbon group, R' is a member selected from the group consisting of the hydrogen atom and the monovalent hydrocarbon group, R'' is a divalent hydrocarbon group, $n$ is an integer from 0 to 2 inclusive and each nitrogen atom is interconnected to silicon through at least three carbon atoms.

References Cited by the Examiner

UNITED STATES PATENTS

| 2,978,471 | 4/61 | Fekete | 260—46.5 |
| 2,934,550 | 4/60 | Jack | 260—448.2 |
| 2,951,860 | 9/60 | Plueddemann | 260—448.2 |
| 2,963,503 | 12/60 | Marsden | 260—46.5 |
| 2,978,471 | 4/61 | Fekete | 260—46.5 |

MURRAY TILLMAN, *Primary Examiner.*

MILTON STERMAN, HAROLD N. BURSTEIN, WILLIAM H. SHORT, *Examiners.*

UNITED STATES PATENT OFFICE
CERTIFICATE OF CORRECTION

Patent No. 3,203,923                      August 31, 1965

Frank Fekete

It is hereby certified that error appears in the above numbered patent requiring correction and that the said Letters Patent should read as corrected below.

Column 12, lines 6 to 10, the formula should appear as shown below instead of as in the patent:

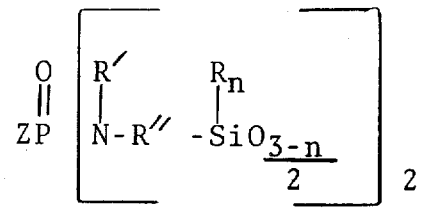

Signed and sealed this 1st day of August 1967.

(SEAL)
Attest:

EDWARD M. FLETCHER, JR.                    EDWARD J. BRENNER
Attesting Officer                           Commissioner of Patents